Patented Apr. 22, 1952

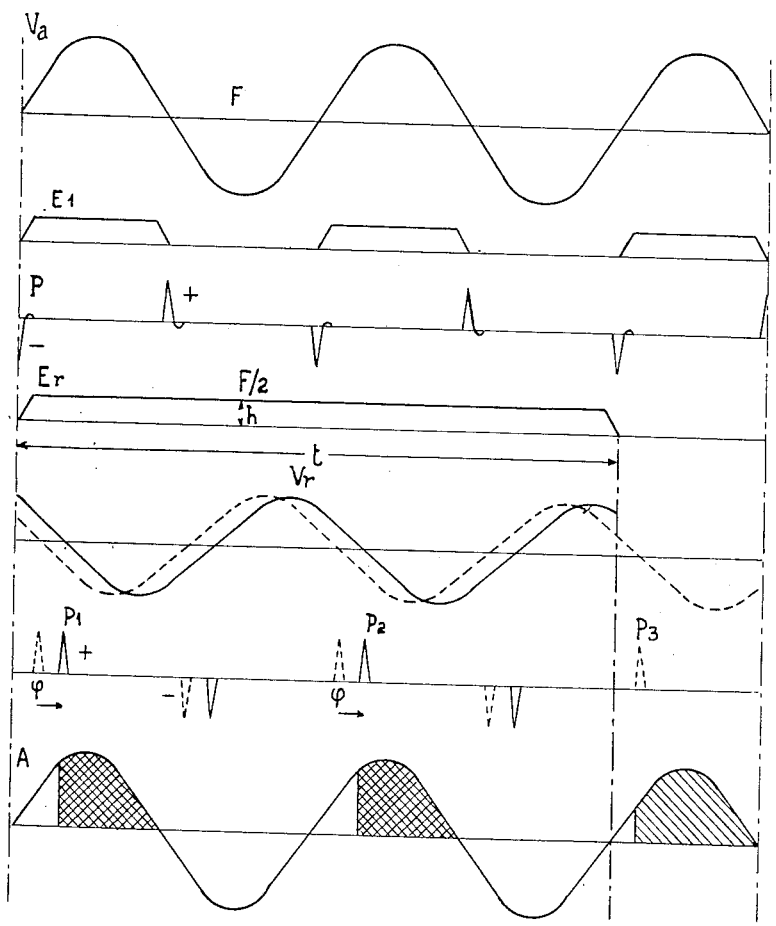
Fig: 3

2,593,656

UNITED STATES PATENT OFFICE 2,593,656

MOTOR SPEED CONTROL MECHANISM

Henri Chireix, Paris, France, assignor to Societe Francaise Radio-Electrique, a corporation of France Application October 18, 1949, Serial No. 122,095
In France November 3, 1948

6 Claims. (Cl. 318—328)

This invention relates to servo control systems and, though not limited to its application thereto, is particularly suitable for the control of the speed of electric motors. The invention is particularly concerned with those known servo systems of the kind using grid controlled rectifiers of the mercury vapour or gas thyratron type and in which what is herein termed an "error voltage" i. e. a voltage proportional to the difference between the instantaneous magnitude to be servo-controlled and a reference magnitude e. g. the difference between the speed of a motor and a desired speed is used to control the output from a thyratron rectifier unit fed from an alternating current supply, generally multi-phase. The control is effected practically without power consumption or inertia, by using the error voltage, in any of a variety of known ways, to control the grids of the thyratrons. The output of the rectifier unit, thus varied, is then utilised to modify the value of the magnitude (e. g. motor speed) to be controlled.

In such a system, the well known and serious difficulty is experienced that as soon as it is sought to increase the rate of regulation or the rapidity of servo-control beyond a certain point the system tends to "hunt" badly.

The present invention seeks to provide improved relatively simple servo-systems in which this objectionable tendency to "hunting" is eliminated or substantially reduced.

According to the invention, in a servo system of the kind referred to, a periodic and regular fluctuation the frequency of which is at most equal to the frequency of the supply system feeding the rectifiers and is preferably a sub-multiple of that frequency, is imparted to the pulsatory output of rectifiers feeding the device subjected to servo-control. This fluctuation is superimposed on the normal, error-voltage controlled variation of the rectifier output as effected in a known servo system of the kind referred to. As will be appreciated this additional fluctuation is essentially periodic and regular in character and at a predetermined frequency whereas the error voltage fluctuation is sporadic in character.

In carrying out the invention the frequency of the regulation provided by this invention, i. e. that of the regular fluctuation, is made higher than the maximum frequency to be expected from the normal error-voltage controlled regulation and also of greater amplitude. As will be seen, quite apart from error-voltage controlled regulation, the output voltage supplied by the rectifiers will oscillate regularly between two distinct voltage values, one of which is markedly greater than that necessary for effecting error correction and the other markedly smaller. Accordingly the whole servo system, whatever the error to be corrected and even if there is no error, is continuously and regularly subjected to instantaneous corrections of opposite sign and occurring at a pre-determined frequency. Accordingly hunting is elimniated or much reduced. The rapidity of regulation is a function of the frequency at which the regular voltage changes imposed on the rectifier unit are effected and may be varied by using a selected sub-harmonic of the frequency of the supply system and varying the sub-harmonic selected. The degree of error correction effected depends on the relative divergence between two consecutive values of the rectifier unit voltage and can therefore be controlled by controlling said divergence.

In the preferred embodiments of the invention there is derived from the normally provided mains or other supply system, a periodic voltage which is synchronised therewith and is preferably a sub-harmonic of the frequency thereof, and this is applied to the grids of the normally provided thyratrons to provide the required regular fluctuation by regularly varying their firing times.

This periodic voltage is preferably in the form of brief periodic impulses which determine the moments of firing and which are periodically phase shifted. As will be obvious these impulses will determine the output of the thyratrons. The impulses can be derived from the supply in any of a variety of different ways, in particular by first producing rectangular signals at the supply frequency, dividing their frequency, applying them to a phase shifting circuit which is fed from the supply and is so arranged as to produce divided frequency signals of periodically varied phase, and finally transforming these signals into brief impulses which are applied to control the grids of the thyratrons.

Periodic regulating signals provided for carrying out this invention can, if desired, be mixed with error voltage before the production of control impulses as above described so as to subject the error voltage also to phase shift due to the control action.

It is however also possible to cause the supply voltage to act direct, as in the ordinary well known circuits, on the grids of the thyratrons so as to determine their pulsating output, and to superimpose on that voltage (which is, of course sinusoidal) a rectangular voltage wave serving to effect a required periodic variation of the moment of firing of the thyratron.

The amplitude of the oscillatory variation of the moment of priming may be adjusted by adjusting the amplitude of the rectangular regulating wave which, in a preferred circuit, is applied to vary the internal resistance of a thermionic valve forming part of a phase-shifting bridge of conventional type for producing a variable phase shifting voltage. The error voltage may, with advantage, be applied to the same valve.

The invention is illustrated in the accompanying drawings in which:

Figure 3 is an explanatory graphical figure.

The same references are used for the same parts wherever possible.

Figure 1:
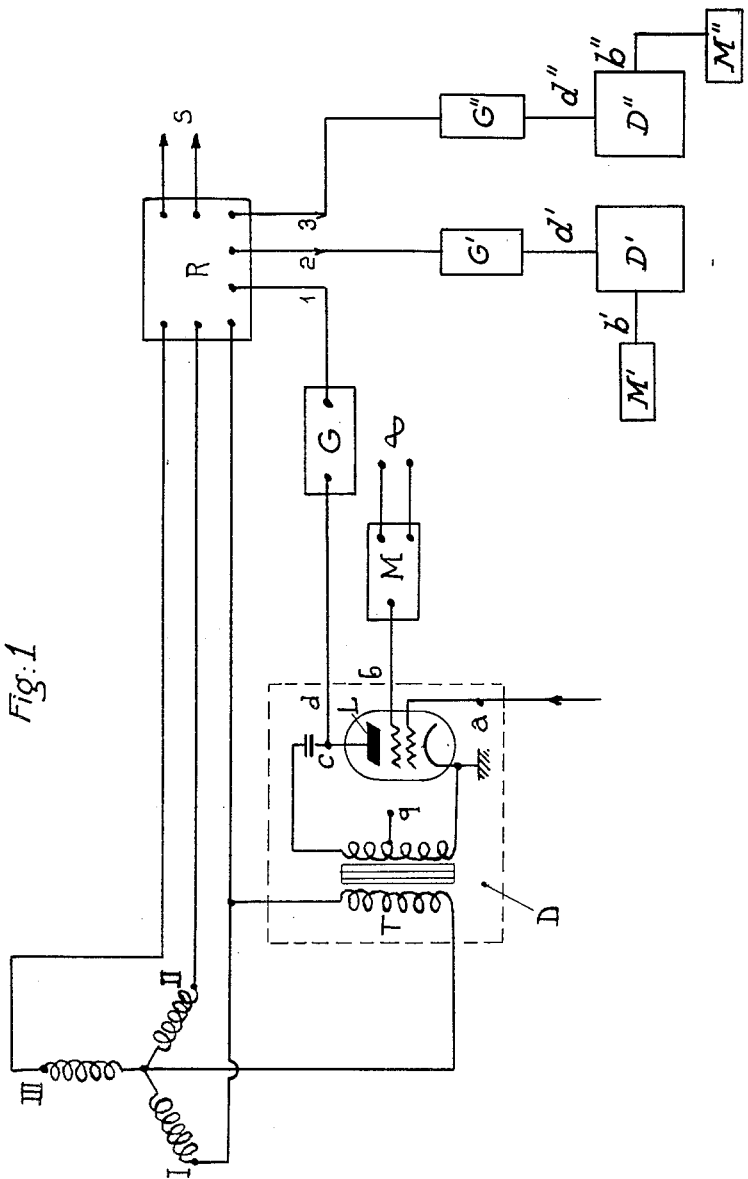
Figure 1 is a diagram showing the general arrangement of one embodiment of the invention.

Referring to Figure 1, block R represents a thyratron rectifier unit which is fed by a three-phase supply system XYZ and supplies its rectified current output at S. I, 2, 3 are the terminals leading to the grids of the thyratrons, which are not individually shown. As known, these terminals must be fed by voltages taken, for example from the three phase system I, II, III. In order to explain the principle of the invention, only one of these phases will be considered, it being understood that the arrangements as regards the other phases correspond.

An error voltage, obtained in any known way, is applied at terminal $a$ to control a phase shifter unit generally designated D which provides an output voltage which varies in relation to its input voltage in accordance with the magnitude and the direction of the error voltage, this variation occurring round a mean value which is itself regulable.

The phase shifted voltage thus obtained is then fed to a device G, which may for example be an electronic tube or a saturated inductance, and which transforms the applied sinusoidal voltage into a positive voltage impulse. The times of occurrence of these impulses depend upon the error voltage and it will be apparent that the output voltage at S will undergo the desired fluctuations in dependence upon these times of occurrence. The phase shifter unit D may be arranged as illustrated in the figure. Here a condenser C and a tetrode L are in series across the secondary terminals of a transformer T said secondary having a middle point tapping $q$. The error voltage from point $a$ is applied to the control grid. The input voltage (from one phase winding as shown) is applied to the primary of the transformer T and the output voltage is produced between the tapping $q$ on the secondary and the terminal $d$ between the capacity $c$ and of the plate of the tetrode L. To simplify the drawing the direct current fed circuits of the tetrode have been omitted. This arrangement, which is per se known, gives an output voltage the phase of which varies according to the internal resistance of the tetrode and this in turn depends on the voltage applied at $a$.

In accordance with this invention, there is applied to the second or screen grid of the tube L over lead $b$ a voltage in the form of rectangular pulses derived from a multi-vibrator M synchronized by the supply system. Identical multi-vibrators similarly supply identical pulses to the other phase shifters (not shown) like the phase shifter D, associated with the other phases and also subjected to the same error voltage, it being understood that units like the units G and D are provided for each phase.

In Figure 1 the units G', G'', D', D'', M', M'' and connections $b'$, $b''$, $d'$, $d''$ correspond to the units G, D, M and the connections $b$, $d$, respectively.

As a multi-vibrator can, of course, be synchronised by a frequency which is a multiple of its natural frequency, the rectangular pulses from M may be at a repetition frequency which is a submultiple of the supply system frequency. Further, the amplitude of the voltage applied over lead $b$ may be varied in such manner as to give rise to more or less substantial variations of the phase in relation to its mean value. Thus the voltage S may be made to assume successively, even in the absence of error voltage, two values separated by a desired amount (which may be regulated) said values occuring at a frequency which may itself be regulated.

Figure 2:
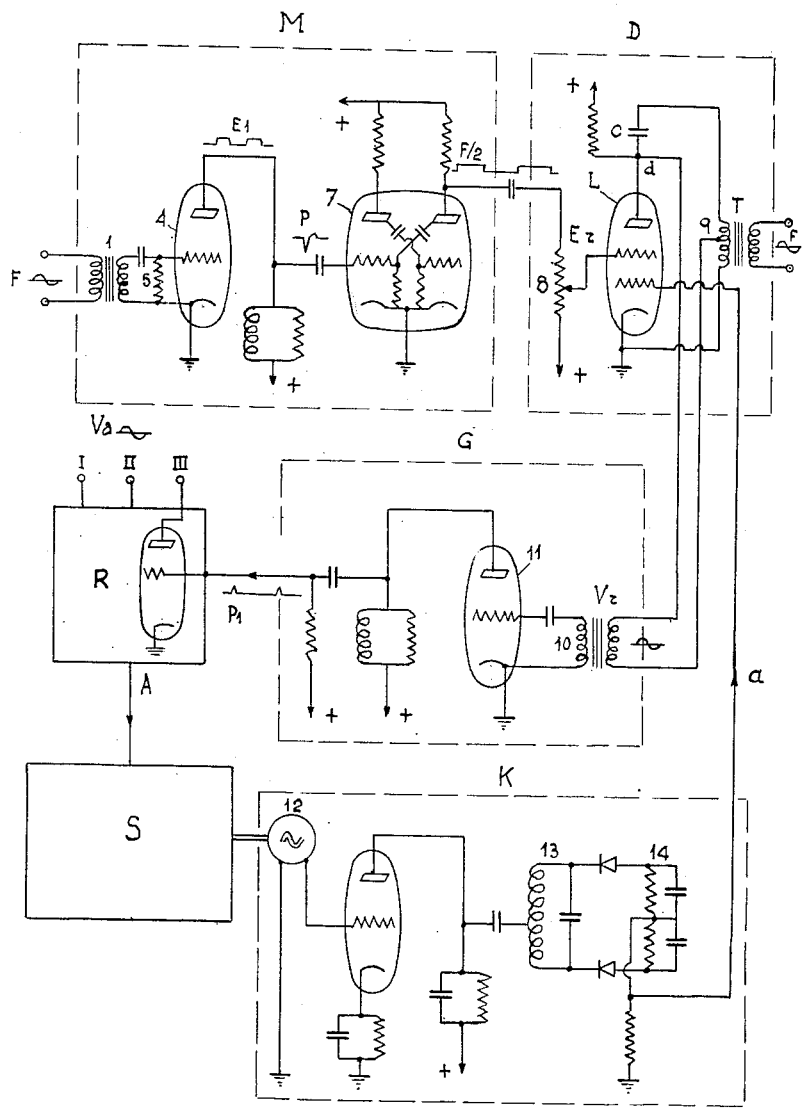
Figure 2 shows the same embodiment in more detailed diagrammatic form.

In Figure 2 which is a more detailed diagram the references M, D, G, R and S represent the same units as in Figure 1. As will be seen voltage from the supply system is applied through a transformer I (incorporated in the phase shifter) to an amplitude clipping valve 4 operating to clip the input (as represented at EI) by virtue of the grid current in grid resistance 5 and supplying rectangular impulses as indicated at EI to the damped self-inductance circuit shown in the anode circuit of valve 4. This damped circuit transforms the pulses into brief impulses (as indicated at P) of opposite polarities. Valve 4 is coupled to a cross-connected vibrator valve arrangement 7 having two states of stability and operated in well known way by the negative impulses. By suitable and known design of the circuits of the valve 7 it is arranged to produce a rectangular periodic voltage wave as indicated at F/2 the frequency of which is a submultiple of the frequency of the supply system—in this case half the supply frequency. This voltage is applied via a potentiometer 8 which provides for amplitude regulation, to one of the grids—as shown the screen grid—of a mixer tube L (this is the same tube L as in Figure 1), whose anode is fed from the supply system (indicated at F) through transformer T. The other grid of tube L receives the error voltage through the line $a$ which ends in a servo regulator device to be described below. This tube L behaves as a variable resistance forming part of a bridge which supplies between the points $d$ and $q$ an alternating regulating voltage Vr, which is fed through transformer 10 and clipped in a valve 11 so as to obtain rectangular signals, which are transformed by means of the damped inductance circuit shown in the plate circuit of valve 11 into a series of impulses $P_1$, $P_2$, $P_3$ . . . which are applied (as already described in connection with Figure 1) to the grids of the thyratrons in the feed rectifer unit R. The various voltage relations are conventionally graphically represented in Figure 3 in which the different wave forms at different parts of Figure 2 are indicated by reference letters used both in Figure 2 and Figure 3. As will be seen the positions in time of the impulses $P_1$, $P_2$ . . . varies by an angle $\phi$ during the period $t$ of application to the mixing tube L of the regulating voltage Er. This phase shifting ceases at the moment when the regulating voltage passes through zero and the control impulses resume their normal positions such as $P_3$ (indicated in broken lines in Figure 3) derived from the phase, also represented in broken lines, of the sinusoidal voltage $V_r$. Only the positive impulses operate the thyratrons to determine the moments of their firing. The firing times will thus be subjected to a phase shift $\phi$ during the period $t$ and will resume normal working outside that period. This of course results in a fluctuation of the thyratron output in dependence on the phase shifting of the alternating voltage $V_r$.

The rectifier anode circuit A feeds the controlled devices S, with which is associated a device K which generates the error voltage and which may take any suitable known form. In the case where the controlled device S is a motor, for example, whose speed is to be controlled, said motor may drive an alternator 12, the voltage of which is applied to a conventional frequency discriminator, comprising a tuned circuit 13 and two rectifiers 14 connected in opposition, and which supplies, as will readily be understood, a D. C. voltage the amplitude of which varies with the speed of the motor and which is applied to the line $a$.

Regulation of the amplitude of the periodic phase shifting may be effected, in the arrangement illustrated in Figure 2, by regulating the potentiometer 8.

It will be obvious that the voltages at $a$ and $b$ may be applied simultaneously to the same electrode of the tube L. Similarly, the system may have two phase shifters in cascade, one of which is controlled by the error voltage at $a$ and the other by the voltage at $b$.

The invention is not limited to the particular arrangements described and illustrated and other arrangements in which there is application (for control) of an error voltage and a correcting voltage pulsating at a periodic frequency such as the mains or a submultiple thereof, may be used.

I claim:

1. In an electric servo-mechanism for regulating and controlling a circuit subjected to variations of control and fed with a unidirectional current supplied by a rectifier having a thyratron tube fed by an A. C. line, the thyratron tube including a control grid permitting to control the output of the thyratron tube by selecting the instant of the alternating cycle in which a voltage rendering the thyratron tube conductive is applied to the grid, in combination, a voltage source supplying a sinusoidal voltage synchronous with the A. C. line; means responsive to the variations of control and permitting to produce an error voltage in dependence on the variations of control; a source of rectangular pulses; a phase shifter unit for shifting the phase of the sinusoidal voltage by an angle depending as to sense and magnitude on the instantaneous value of the error voltage and the voltage of the rectangular pulses; means for converting the dephased sinusoidal voltage into pulses of short duration having a frequency of recurrence equal to the frequency of the sinusoidal voltage; and means for applying the pulses to the control grid of the thyratron tube, whereby the mean control of the circuit is kept substantially constant.

2. In an electric servo-mechanism for regulating and controlling a circuit subjected to variations of control and fed with a unidirectional current supplied by a rectifier having a thyratron tube fed by an A. C. line, the thyratron tube including a control grid permitting to control the output of the thyratron tube by selecting the instant of the alternating cycle in which a voltage rendering the thyratron tube conductive is applied to the grid, in combination, a voltage source supplying a sinusoidal voltage synchronous with the A. C. line; means responsive to the variations of control and permitting to produce an error voltage in dependence on the variations of control; a source of rectangular pulses having a frequency of recurrence equal to a submultiple of the frequency of the A. C. line; a phase shifter unit for shifting the phase of the sinusoidal voltage by an angle depending as to sense and magnitude on the instantaneous value of the error voltage and the voltage of the rectangular pulses; means for converting the dephased sinusoidal voltage into pulses of short duration having a frequency of recurrence equal to the frequency of the sinusoidal voltage; and means for applying the pulses to the control grid of the thyratron tube, whereby the mean control of the circuit is kept substantially constant.

3. In an electric servo-mechanism for regulating and controlling a motor subjected to variations of speed and fed with a unidirectional current supplied by a rectifier having a thyratron tube fed by an A. C. line, the thyratron tube including a control grid permitting to control the output of the thyratron tube by selecting the instant of the alternating cycle in which a voltage rendering the thyratron tube conductive is applied to the grid, in combination, a voltage source supplying a sinusoidal voltage synchronous with the A. C. line; means responsive to the variations of speed and permitting to produce an error voltage in dependence on the difference between the instantaneous speed of the motor and the speed to be maintained; a source of rectangular pulses; a phase shifter unit for shifting the phase of the sinusoidal voltage by an angle depending as to sense and magnitude on the instantaneous value of the error voltage and the voltage of the rectangular pulses; means for converting the dephased sinusoidal voltage into pulses of short duration having a frequency of recurrence equal to the frequency of the sinusoidal voltage; and means for applying the pulses to the control grid of the thyratron tube, whereby the speed of the motor is kept substantially constant and hunting is substantially reduced.

4. In an electric servo-mechanism for regulating and controlling a motor subjected to variations of speed and fed with a unidirectional current supplied by a rectifier having a thyratron tube fed by an A. C. line, the thyratron tube including a control grid permitting to control the output of the thyratron tube by selecting the instant of the alternating cycle in which a voltage rendering the thyratron tube conductive is applied to the grid, in combination, a voltage source supplying a sinusoidal voltage synchronous with the A. C. line; means responsive to the variations of speed and permitting to produce an error voltage in dependence on the difference between the instantaneous speed of the motor and the speed to be maintained; a source of rectangular pulses having a frequency of recurrence equal to a submultiple of the frequency of the A. C. line; a phase shifter unit for shifting the phase of the sinusoidal voltage by an angle depending as to sense and magnitude on the instantaneous value of the error voltage and the voltage of the rectangular pulses; means for converting the dephased sinusoidal voltage into pulses of short duration having a frequency of recurrence equal to the frequency of the sinusoidal voltage; and means for applying the pulses to the control grid of the thyratron tube, whereby the speed of the motor is kept substantially constant and hunting is substantially reduced.

5. In an electric servo-mechanism for regulating and controlling a motor subjected to variations of speed and fed with a unidirectional current supplied by a rectifier having a thyratron tube fed by an A. C. line, the thyratron tube including a control grid permitting to control the output of the thyratron tube by selecting the instant of the alternating cycle in which a voltage rendering the thyratron tube conductive is applied to the grid, in combination, a voltage source supplying a sinusoidal voltage synchronous with the A. C. line; means responsive to the variations of speed and permitting to produce an error voltage in dependence on the difference between the instantaneous speed of the motor and the speed to be maintained; a source of rectangular pulses having a frequency of recurrence equal to a submultiple of the frequency of the A. C. line; a phase shifter unit for shifting the phase of the sinusoidal voltage by an angle depending as to sense and magnitude on the instantaneous value of the error voltage and the voltage of the rectangular pulses; means for converting the dephased sinusoidal voltage into pulses of short duration having a frequency of recurrence equal to the frequency of the sinusoidal voltage; and means for applying the pulses to the control grid of the thyratron tube, whereby the speed of the motor is kept substantially constant and hunting is eliminated.

6. In an electric servo-mechanism for regulating and controlling a circuit subjected to variations of control and fed with a unidirectional current supplied by a rectifier having a thyratron tube fed by an A. C. line, the thyratron tube including a control grid permitting to control the output of the thyratron tube by selecting the instant of the alternating cycle in which a voltage rendering the thyratron tube conductive is applied to the grid, in combination, a voltage source supplying a sinusoidal voltage synchronous with the A. C. line; means responsive to the variations of control and permitting to produce an error voltage in dependence on the variations of control; a source of rectangular pulses having a frequency of recurrence equal to a submultiple of the frequency of the A. C. line; a phase shifter unit for shifting the phase of the sinusoidal voltage by an angle depending as to sense and magnitude on the instantaneous value of the error voltage and the voltage of the rectangular pulses; means for converting the dephased sinusoidal voltage into pulses of short duration having a frequency of recurrence equal to the frequency of the sinusoidal voltage; and means for applying the pulses to the control grid of the thyratron tube, said phase shifter unit including an electron tube having two grids, the error voltage being applied to one of said grids and the voltage of said rectangular pulses to the other of said grids, whereby the mean control of the circuit is kept substantially constant.

HENRI CHIREIX.

REFERENCES CITED

The following references are of record in the file of this patent:

UNITED STATES PATENTS

| Number | Name | Date |
| --- | --- | --- |
| 1,376,453 | Meyer | May 3, 1921 |
| 2,010,577 | Wilson | Aug. 6, 1935 |
| 2,080,250 | Bedford | May 11, 1937 |
| 2,288,338 | Willis | June 30, 1942 |